Nov. 13, 1956  H. M. KNOTH  2,770,086
COTTON PICKER DOFFER

Filed March 15, 1954  2 Sheets-Sheet 1

INVENTOR.

Nov. 13, 1956     H. M. KNOTH     2,770,086
COTTON PICKER DOFFER
Filed March 15, 1954     2 Sheets-Sheet 2
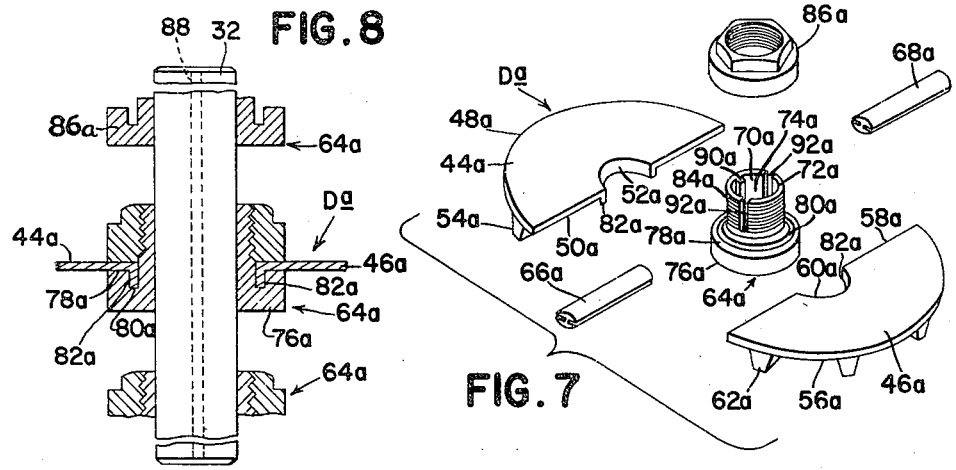
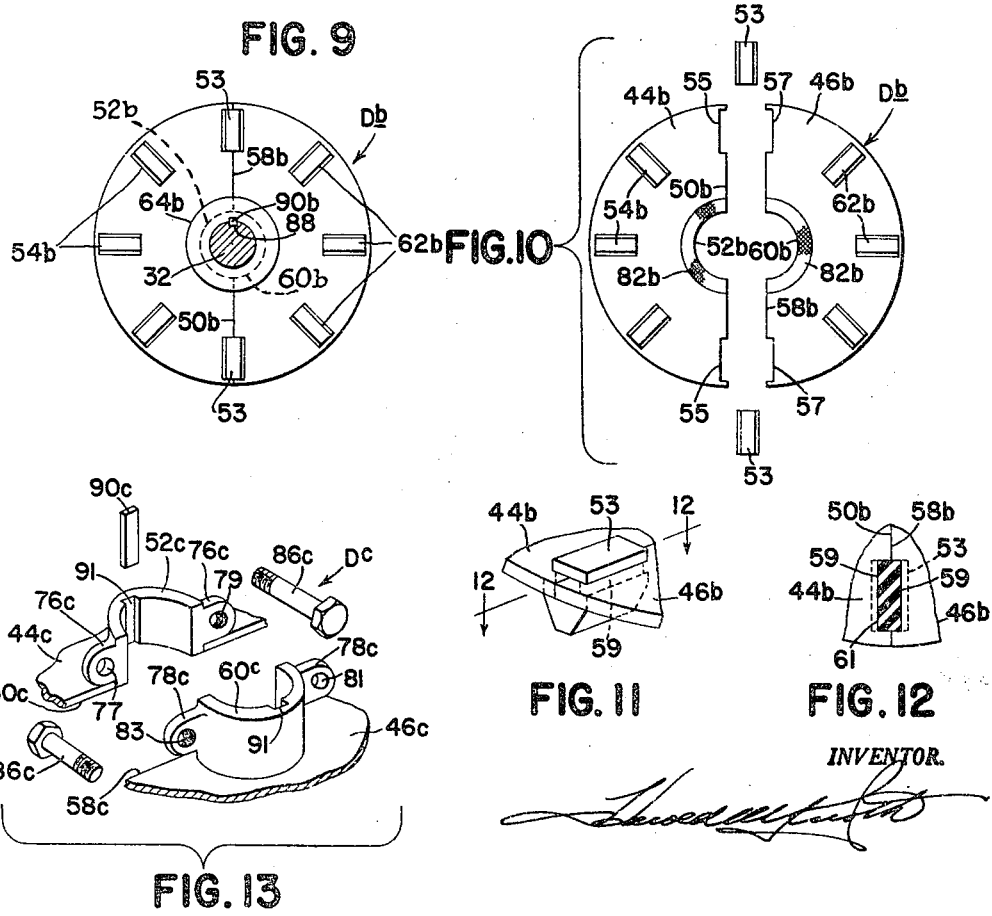
INVENTOR.

United States Patent Office 2,770,086
Patented Nov. 13, 1956

2,770,086

COTTON PICKER DOFFER

Harold M. Knoth, Davenport, Iowa, assignor to Deere & Company, Moline, Ill., a corporation of Illinois Application March 15, 1954, Serial No. 416,016

17 Claims. (Cl. 56—41)

This invention relates to a cotton picker and more particularly to improved doffer construction for a cotton picker of the type comprising a picking drum in which the several spindles move respectively through orbits to first pick the cotton and then to pass through rotary doffing means that function to wipe or doff the cotton from the individual spindles.

A representative basic organization of the character just referred to forms the subject matter of U. S. Patent 2,660,852, issued to L. A. Paradise. As seen in that patent and as familiar to those versed in the art, a row unit for picking cotton includes an upright drum comprising a plurality of picker bars or columns arranged to follow a somewhat elliptical path for projecting spindles into plants and subsequently retracting the loaded spindles from the plants and thereafter to cause the spindles to pass through a series of circular doffers mounted on an upright shaft parallel to the picking drum shaft. Each picker bar carries a plurality of spindles, in most cases there being twenty spindles to each bar. Accordingly, the doffing mechanism will include as many circular doffers as there are spindles per picking bar. These doffers are conventionally constructed of metal with rubber or the like doffing blocks thereon; although, in some cases they may be constructed wholly of rubber. Because of the nature of the doffers and the use to which they are put, it often becomes necessary to replace one or more doffers in the assembly. Since the several doffers are mounted on a single shaft, it becomes necessary to disassemble the entire doffing mechanism in order to effect the replacement of a single doffer. Various schemes have been resorted to in the past for improving the situation, the most notable of which are the several designs of so-called throw-away doffers. However, in no case has there ever been devised a multi-section or multi-piece doffer constructed so that it may be disassembled and removed without moving it axially endwise off of the doffer shaft.

Therefore, it is a principal object of the present invention to provide a multi-piece doffer made up of a plurality of complementary sections contiguously grouped about the doffer shaft or support in a common plane normal to the axis of rotation of the support to comprise a unit assembly having all of the operational characteristics of a conventional doffer. Because of the separability of the several sections, appropriate disconnectible means at the center of the sections may be released to enable the sections to be separated in a radial direction from the shaft, thus avoiding the necessity of removing doffers that need not be replaced. Obviously, the same advantages are obtainable in reverse order in connection with the replacement of a similar doffer on the shaft.

Other objects of the invention, in the various forms thereof, reside in the design of a simple and low-cost doffer construction having the characteristic just noted; in economically constructed means for holding the doffer sections in place; in the combination of the retaining characteristics of the securing means for creating clamping forces effective in axial and radial directions; and in the relationship of the doffer sections in such manner that the joints between the contiguous sections are sealed against the entrance and accumulation of stray wisps of cotton.

The foregoing and other important objects and desirable features inherent in and encompassed by the invention will become apparent as several forms of the invention are disclosed in detail in the following description and accompanying sheets of drawings, the several figures of which are described immediately below.

Fig. 7 is an exploded perspective showing a modified form of doffer construction generally similar to but specifically different from that shown in Fig. 2.

Fig. 8 is a sectional view, corresponding generally in nature to Fig. 6, but illustrating the doffer of Fig. 7.

Fig. 9 is a bottom plan similar to Fig. 5 but showing a different form of doffer in which a pair of doffing blocks is releasable from the separable doffer halves.

Fig. 10 is an exploded bottom plan of the structure in Fig. 9.

Fig. 11 is a perspective, on a slightly enlarged scale, showing the relationship between the doffer halves and one of the separable doffing blocks.

Fig. 12 is a fragmentary sectional view as seen substantially along the line 12—12 of Fig. 11.

Fig. 13 is a fragmentary exploded perspective showing a modified form of securing means for interconnecting the separable doffer halves.

Figure 1:
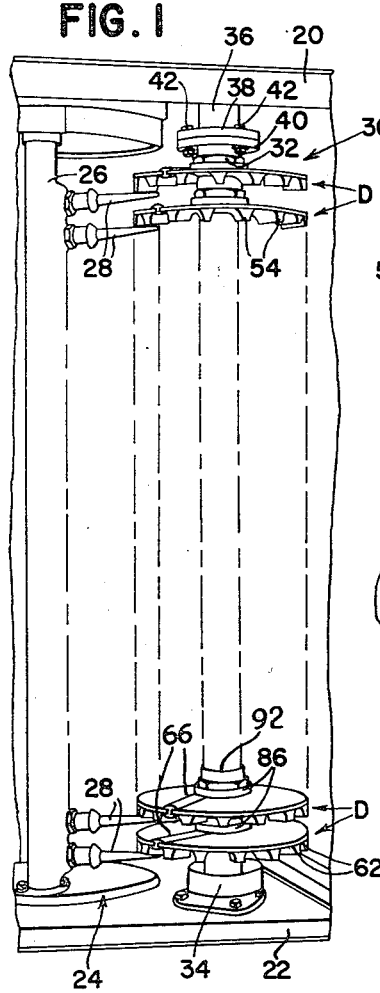
Fig. 1 is a fragmentary over-all view showing the basic organization of the doffing mechanism and its relationship to a picker bar, dot-dash lines being utilized to suggest additional doffers and thus to avoid undue repetition.
Figure 2:
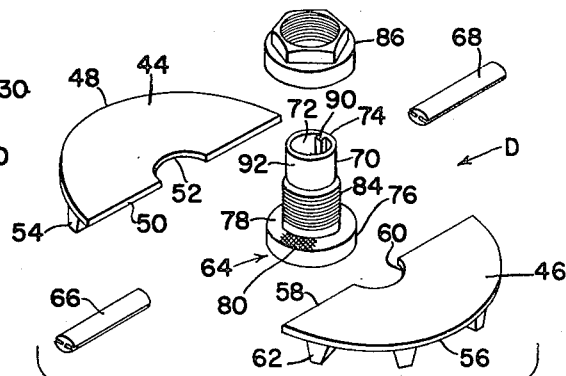
Fig. 2 is an exploded perspective showing the several components that go to make up one of the doffer units.
Figure 4:
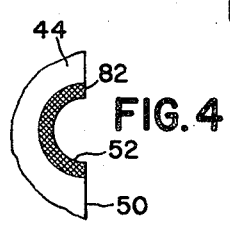
Fig. 4 is a fragmentary bottom view of a central portion of one of the doffer pieces or sections and illustrating one form of means for preventing radial displacement of the doffer.
Figure 3:
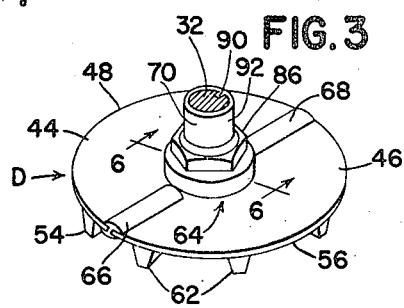
Fig. 3 is a perspective showing these components in assembled relationship.
Figure 5:
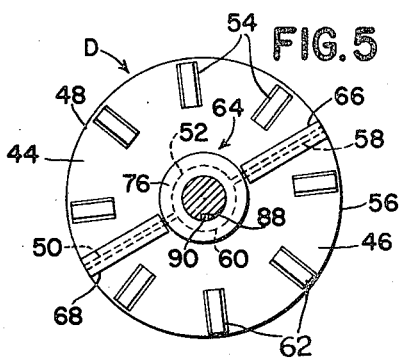
Fig. 5 is a bottom plan of the doffer shown in Figs. 1, 2 and 3.
Figure 6:
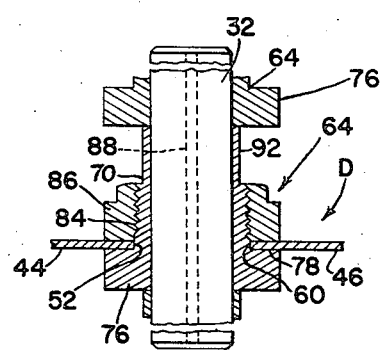
Fig. 6 is a fragmentary sectional view, on an enlarged scale, as seen along the line 6—6 of Fig. 3.

Reference will be had first to Fig. 1 for an over-all description of the cotton-picking mechanism, particularly as respects the picker drum and the doffing mechanism. The numeral 20 represents the top wall or ceiling of a picker housing and the numeral 22 represents the floor of that housing. A rotatable cotton-picking drum, designated generally by the numeral 24, is carried for rotation on an upright axis, as by a central shaft (not shown) journaled at its upper and lower ends respectively in the ceiling 20 and floor 22. This drum, as is conventional, carries a plurality of columns or picker bars, only one of which is shown and designated by the numeral 26. This picker bar, as well as its companion duplicates, carries a plurality of vertically spaced picker spindles 28, there being in the usual case twenty or more spindles carried by each bar. Dot-dash lines have been used in Fig. 1 to suggest the presence of spindles in addition to the top and bottom pairs illustrated. As is conventional, the drum rotates to cause the picker bars to move through somewhat elliptical orbits and thereby to cause the spindles 28 to be projected into and be retracted from cotton plants in a row along which the machine is operated. After the spindles are retracted from the plants, they are caused to pass through doffing mechanism, such as that designated generally by the numeral 30 here, the purpose of the doffing mechanism being to strip, wipe or doff the cotton from the loaded spindles. As is conventional, the doffing mechanism comprises an upright elongated rotatable support or shaft 32 journaled at its lower end in a bearing 34 on the housing floor 22 and separably connected to a short doffer shaft extension 36 journaled in any appropriate manner in the ceiling 20 of the housing. Representative of the separable connection is the structure shown in Fig. 1, comprising flanges 38 and 40 on the respective shafts 32 and 36 and a plurality of bolts 42 for securing the shafts together. The shaft carries thereon a plurality of circular doffers, each being identified, as to that form of the invention shown in Figs. 1 through 6, by the reference letter D. There are as many doffers D as there are horizontal rows of spindles 28; here again dot-dash lines have been used to represent the presence of doffers in addition to the pairs shown at the top and bottom of the doffer support or shaft 32.

To the extent described, the construction may be accepted as conventional, on which basis it may be temporarily assumed that each of the doffers D is a solid circular plate removable only axially endwise from the shaft 32 after a separation is effected at the flanges 38 and 40, representative of which is the doffer shown in U. S. Patent 2,247,682. It will thus be appreciated that removal and replacement of one or more doffers, particularly those intermediate the upper and lower ends of the assembly 30, is a somewhat difficult task. According to the present invention, this difficulty is eliminated and changing of doffers is quite simple.

Each of the doffers D (referring now to Figs. 1 through 6) is made up of a plurality of sector-shaped plate-like elements 44 and 46 contiguously grouped about the support or shaft in a common plane normal to the axis of rotation of the shaft to comprise the circular plate-like assembly D, which assembly has, of course, the axis of the shaft as its center. In the preferred embodiment of the invention shown, each element 44, 46 is semicircular, the element 44 having an arcuate or semicircular peripheral edge 48 and a diametral edge 50 interrupted at the center-proximate portion thereof by a semicircular support- or shaft-receiving notch 52. The plate-like element 44 may be of any appropriate construction, such as heavy gauge sheet metal or even a casting, if desired, which details are relatively unimportant. This element has upper and lower faces as is conventional and has secured to its lower face a plurality of doffing blocks 54 constituting doffing means operative in the conventional fashion for doffing or wiping cotton from the spindles 28. Corresponding characteristics are present in the element 46, since the two elements are preferably identical. Thus, the element 46 has an arcuate or semicircular peripheral edge 56, a straight diametral edge 58, a shaft-receiving notch 60 and doffing means in the form of doffing blocks 62.

In that form of the invention illustrated in Figs. 1 through 6, the doffer assembly D is carried on the main support or shaft 32 by the intervention of a second support, here in the form of a hub designated generally by the numeral 64. As will be more clearly brought out below, the doffer elements when assembled, embrace the hub 64 via the notches 52 and 60 and since each diametral edge 50 and 58 inherently includes a pair of radius edges, these radius edges, the elements being semicircular, will lie contiguously and in closely spaced apart relationship. Since in some cases it is likely that the manufacturing tolerances will build up such as to increase the size of the space between the diametral or radius edges to an extent possibly permitting stray wisps of cotton to be caught and to accumulate in the space, it is desirable to provide a pair of sealing strips, such as those designated by the numerals 66 and 68, which strips, in a manner that will be obvious without further description, fill or enclose the space. Each strip may be preferably made of rubber or some such substance having the desirable characteristics required.

The hub 64 comprises a shaft-encircling sleeve portion 70 having a shaft-receiving bore 72, a top or upper end 74 and a bottom or lower end comprising doffer-mounting means in the form of an annular flange 76 of greater diameter than the sleeve portion 70 and thus extending radially outwardly beyond the periphery of the sleeve. The flange 76 has a top surface 78 which has means thereon in the form of teeth or serrations 80, preferably formed by knurling, cooperative with complementary means such as teeth or serrations formed by knurling on the undersurfaces of the elements 44 and 46. Knurling of the character referred to is shown at 82 on the hub-proximate portion of the element 44, it being understood that the hub-proximate portion of the other element 46 is similarly designed. The surface 78 on the hub flange 76 thus constitutes a seating surface on which the center-proximate portions of the elements 44 and 46 seat; likewise, these center-proximate portions constitute cooperative seating portions respectively on the sector elements 44 and 46.

An intermediate portion of the sleeve 70, next adjacent to or above the seating flange or doffer-mounting means 76, is threaded, as at 84, and the threaded portion 84 comprises part of means, further including a nut 86, operative to releasably secure the doffer elements 44 and 46 to the hub 64. The hub and nut are, of course, relatively axially movable and when the nut 86 is tightened on the threaded portion 84 of the sleeve it exerts an axial compressive force or clamping action, thus holding the elements 44 and 46 in place to comprise the circular doffing assembly D. Because of the cooperation between the serrations or knurling at 80, 82 and the knurling present on the element 46, the elements are held against radial displacement and will not separate during operation of the doffing mechanism.

The doffer shaft 32 has an axial keyway 88 and the hub may be provided with an integral cooperative key 90, or the key may be a separate piece, which is of no particular moment other than that some provision should be made for interconnecting the hub 64 and shaft 32 for rotation in unison.

The sleeve 70 has an unthreaded coaxial extension portion 92 of smaller diameter than the threaded portion 84 and the axial length of the threaded portion is preferably equal to the axial height of the nut 86 so that no threads are exposed above the top of the nut, thus eliminating the possibility of stray wisps of cotton accumulating on exposed threads. Further than that, the unthreaded portion 92 serves as a spacer for abutting the bottom end of the next higher hub as represented by the doffer-mounting flange 76 thereon. Thus, when the plurality of doffers 20 is arranged on the shaft 32, the spacing means provided by the unthreaded sleeve extensions 92 establish uniform axial spacing of the doffers and the top end of each sleeve therefore abuts the bottom of the next higher hub, with the exception of the uppermost hub in the assembly, as will be obvious.

From the foregoing description, it will be seen that any individual doffer assembly may be separated simply by releasing its nut 86, which releases the axial pressure on the center-proximate portions of the doffer elements 44 and 46 and enables these elements to be released from their cooperation with the seating flange 76 and thus the elements may be withdrawn in a radial direction from the doffer assembly, thus obviating axial removal of doffer elements next adjacent to that desired to be replaced. Replacement may be effected by identical sectors or elements and the nut 86 retightened to secure the replacement doffer unit in place. If the sealing strips 66 and 68 are worn, they can be easily replaced. Of course, the height of the sleeve extension 92 is such as to enable sufficient loosening of the nut 86 to enable the doffer elements to be removed and replaced.

In Figs. 7 and 8 is shown a modified form of doffer assembly or unit, designated generally by the numeral $D^a$.

To the extent that this unit is similar to the unit D, reference characters carrying the exponent "a" will be used. Thus, the doffer $D^a$ comprises semicircular plate-like elements $44^a$ and $46^a$, the element $44^a$ having a semicircular or arcuate peripheral edge $48^a$, a diametral edge $50^a$ interrupted by a support-receiving notch $52^a$ and carrying at its undersurface doffing means in the form of a plurality of doffing blocks $54^a$. Corresponding parts may be readily identified as to the other element $46^a$ by the numerals $56^a$, $58^a$, $60^a$ and $62^a$.

The hub in the multi-piece doffer $D^a$ is designated generally by the numeral $64^a$ and the two elements $44^a$ and $46^a$ are adapted to be contiguously grouped about the hub to form the circular plate-like doffer assembly or unit $D^a$, sealing strips $66^a$ and $68^a$ being used in the same manner as the sealing strips 66 and 68 in connection with the assembly of the doffer D.

The hub $64^a$ includes a sleeve portion $70^a$ having a top end $72^a$, a shaft-receiving bore $74^a$ and provided at its lower end with a doffer-mounting flange $76^a$, the upper surface of which provides a seating surface $78^a$ cooperative with center-proximate portions of the elements $44^a$ and $46^a$.

One of the differences between the doffers D and $D^a$ is that the latter, instead of having its seating surface $78^a$ knurled as in the case of the doffer D, has instead an annular groove $80^a$ for receiving semicircular tongues or tangs $82^a$ respectively bordering notches $52^a$ and $60^a$ of the elements $44^a$ and $46^a$. When the elements are assembled in grouped relationship about the hub $64^a$, the semicircular tongues $82^a$ cooperate with the hub groove $80^a$ to constitute releasable means for preventing displacement radially of the elements relative to the hub and operate very much like the serrations or teeth in the doffer unit D, being merely representative of another form that the releasable means can take.

The hub $64^a$, like the hub 64, has a threaded portion, here designated at $84^a$, the threads being formed on the external surface of the sleeve $70^a$. A nut $86^a$ very much like the nut 86 cooperates with the threads $84^a$ to afford axially movable securing means releasable when unthreaded to release the doffer elements $44^a$ and $46^a$. As in the case of the nut 86, the nut $86^a$ when tightened exerts an axial compressive force securing the doffer elements $44^a$ and $46^a$ in place.

Another distinction of the doffer $D^a$ over the doffer D is that the doffer $D^a$ does not have on its sleeve an extension comparable to the extension 92 of the doffer D. Instead, the sleeve $70^a$ is somewhat shorter and has therein a pair of diametrically opposed, axially extending slits $92^a$, thus giving the sleeve the form of a collet which when tightened exerts also a diametral force on the shaft 32 for holding the doffer unit against axial displacement. The nut may be loosened to relax the collet effect so that the doffer may be adjusted axially of the shaft 32. Therefore, as will be seen in Fig. 8, it is desirable to allow a little axial space between each of the doffer assemblies.

The hub $64^a$ may have a key $90^a$ for cooperation with the keyway 88 in the doffer shaft 32.

Figs. 9 and 10 show a further modified form of doffer, here designated generally by the character $D^b$. This doffer may have any type of split or releasable hub; for example, that of either of the doffers D or $D^a$ or may have selected features of each, which is per se immaterial, since the presently pertinent characteristic of the doffer $D^b$ as distinguished from the doffers D and $D^a$ is that the doffer $D^b$ provides for the releasable mounting of certain of the doffer blocks, such as those at 54 and 62 in the doffer D. The doffer $D^b$ comprises a pair of complementary semicircular doffer elements $44^b$ and $46^b$, respectively having diametral edges $50^b$ and $58^b$ interrupted respectively by hub-receiving notches $52^b$ and $60^b$. As shown in Fig. 10, the center-proximate portions of the elements $44^b$ and $46^b$ are knurled, as at $82^b$ for cooperation with a hub such as the hub 64. The knurling $82^b$ may be as well replaced by the semicircular tongues $82^a$ of the doffer $D^a$. This is immaterial as respects the instant form of the invention.

The element $44^b$ has permanently affixed thereto a plurality of doffer blocks $54^b$ and permanently affixed doffer blocks $62^b$ are carried by the other element $46^b$. The two sets of doffer blocks just described establish a number of doffer blocks fewer than that required, but the additional number is supplied by a pair of separate blocks 53. The diametral edge $50^b$ of the element $44^b$ is interrupted at two points thereon spaced diametrically apart to provide semirectangular notches 55. Complementary notches 57 are formed in the diametral edge $58^b$ of the element $46^b$. When the two elements are assembled, the complementary notches 55—57 receive a block 53 therebetween, this result being accomplished at both sides of the center of the doffer $D^b$. As best shown in Figs. 11 and 12, the block 53 is grooved at each of its long sides, as at 59, to provide the block with a reduced neck portion 61 whereby the block is retained in the assembled doffer against escape both radially and axially. For the purposes of illustration, the doffer assembly is shown as including a hub, designated here in its entirety by the numeral $64^b$; although, as expressed above, the specific hub details are not material since any type or split or releasable hub may be used with the principle of the blocks 53. A key $90^b$ is shown in Fig. 9 as cooperating with the keyway 88 in the shaft 32.

The blocks 53, engaged as they are between the proximate diametral or radius edges of the elements $44^b$ and $46^b$, serve to prevent excessive relative deflection of the elements in those cases in which the elements are formed of relatively light material.

Fig. 13 represents another form of doffer, designated in its entirety by the character $D^c$, the figure showing just the central portion thereof, since the external portions are not specifically material and could be those of any of the doffers previously described. In this form of the invention, the complementary doffer halves or elements $44^c$ and $46^c$, respectively have diametral edges $50^c$ and $58^c$ and may be grouped about the support afforded by the doffer shaft 32 to establish a circular plate-like doffer element including a pair of hub halves $52^c$ and $60^c$, these hub halves serving the dual purpose of the hub 64 and center-proximate notches 52 and 60 of the doffer D, for example. The doffer halves $44^c$ and $46^c$, like those previously described, may be symmetrically arranged and may even be identical to facilitate mass production thereof. Thus, each hub half $52^c$ and $60^c$ is provided respectively with a keyway 91 and a key $90^c$ cooperates with one of the keyways 91 and the shaft keyway 88. Unless the shaft 32 has a second keyway 88, one of the keyways 91 in the one hub half will be unused. The hub half $52^c$ has means in the form of a pair of diametrically oppositely extending ears $76^c$, one of which is drilled at 77 and the other of which is tapped at 79. Similar ears $78^c$ are provided on the other hub half $60^c$ and opposite ears respectively are drilled and tapped at 81 and 83. When the doffer elements are assembled, the tapped bore 79 registers with the drilled hole 81 in one ear $78^c$ of the other hub half. Likewise, the tapped bore 83 in the other ear $78^c$ registers with the drilled hole 77 in the opposite ear $76^c$ of the hub half $52^c$. Thus, the doffer elements $44^c$ and $46^c$ may be made identical. Securing means in the form of a pair of cap screws $86^c$ completes the assembly. These securing means, together with the hub halves $52^c$ and $60^c$, cooperate as releasable securing means to secure the doffer halves $44^c$ and $46^c$ together about the shaft 32. In this case, the hub halves $52^c$ and $60^c$ are preferably formed as integral parts of the elements $44^c$ and $46^c$ rather than constituting a separate element as in the case of the doffer D, for example; nevertheless, the same results are achieved. In view of the detailed description of the doffers previously described, it is deemed unnecessary to point out specifically the other characteristics of the doffer D$^c$, since it is obvious that this doffer may have the doffer block construction of the doffers D and D$^a$ or may have the doffer block construction of the doffer D$^b$. Likewise, it is apparent that the doffer D$^c$ may be constructed like the doffer D$^b$ to the extent that loosening of the cap screws 86 will permit slight releasing of the hub halves so that axial adjustability of the doffer may be obtained. Conversely, the hub halves 52$^c$ may each be provided with cooperative semicircular extensions comparable to the sleeve extension 92 in the event that fixed and uniform axial spacing of the doffers is desired.

Various objects and features of the invention is not specifically enumerated herein will undoubtedly occur to those versed in the art, as will numerous modifications and alterations in the preferred forms of the invention disclosed, all of which may be achieved without departing from the spirit and scope of the invention.

What is claimed is:

1. A multi-piece cotton picker doffer for mounting on and for rotation with an elongated rotatable doffer shaft, comprising: an externally threaded hub sleeve having opposite axially spaced ends and an axial shaft-receiving bore therethrough, said hub sleeve having at one end thereof radially outwardly projecting doffer mounting means; a plurality of radially separable sector-shaped plate-like doffer elements having doffing means thereon and contiguously grouped about the hub sleeve in a common plane normal to the axis of rotation to comprise a circular plate-like assembly having said axis as its center, each element having a center-proximate portion seating on the doffer mounting means, each center-proximate portion further having a sleeve-receiving notch therein; and annular, shaft-surrounding, internally threaded releasable means threadedly carried by the hub sleeve and movable axially relative to the hub sleeve toward the doffer mounting means and engaging the seated element portions for securing said elements in assembled relation to the hub and to each other.

2. The invention defined in claim 1, in which: the sleeve is axially split to afford a collet and the releasable means is operative to compress the sleeve diametrically to engage the doffer shaft.

3. The invention defined in claim 1, in which: the sleeve includes a reduced-diameter coaxial extension portion at its end opposite the doffer mounting means and providing a spacer means engageable with another doffer on the doffer shaft.

4. Cotton picker doffer mechanism comprising: an elongated upright rotatable shaft; a plurality of coaxial uniformally axially spaced doffer hubs received by and keyed to the shaft, each hub including a shaft-encircling sleeve means having top and bottom ends and doffer-mounting means fixed to and projecting radially outwardly from said bottom end, each doffer mounting means having an upwardly facing doffer-receiving portion, said hubs being identically dimensioned and constructed and arranged on the shaft with the top end of each sleeve means save that of the uppermost hub abutting the bottom end of the next higher sleeve means to achieve and maintain uniform axial spacing of the doffer mounting means relative to each other; securing means on each hub movable axially selectively toward and away from the respective doffer-receiving portion to selectively establish and relax a clamping effect with said portion; and a plurality of doffers, one for each hub, each doffer comprising a plurality of sector-shaped elements grouped contiguously about the respective hub in a common plane normal to the shaft axis to comprise a circular doffer assembly having said axis as a center, each element in each doffer having a hub-proximate portion received and removably clamped between the respective securing means and its associated doffer-receiving portion.

5. A multi-piece cotton picker doffer for mounting on a rotatable shaft, comprising: a plurality of sector-shaped plate-like doffer elements contiguously grouped about the shaft in a common plane normal to the axis of rotation of the shaft to comprise a circular plate-like assembly having said axis as its center, each element having a center-proximate portion including a notch for closely nested relation to the shaft and each element further having an arcuate outer portion and doffing means carried by said outer portion in an area radially remote from its center-proximate notch; releasable hub means interengageable between the center-proximate portions of the elements and the shaft, said hub means including a pair of cooperative members closely proximate to the shaft and clear of the doffing means area, said members being connectible to hold the elements in assembled relation to the shaft and separable to release the elements for radial withdrawal away from the shaft; and means releasably securing the hub members together.

6. A multi-piece cotton picker doffer for mounting on an upright rotatable support, comprising: a pair of radially separable, symmetrical semicircular doffer halves assembled together with their diametral edges proximate to comprise a circular doffer unit concentric with the support, said doffer halves respectively having complementary support-receiving notches at the centers of their diametral edges for closely nesting the support therebetween and each element further having an arcuate outer portion and doffing means carried by said outer portion in an area radially remote from its support-receiving notch, and annular releasable securing means radially inwardly of the doffing means area and encircling the support and cooperative between the doffer halves and the support for securing said halves together.

7. The invention defined in claim 5, in which: each radius edge of each element lies in closely circumferentially spaced relation to and is paired with a radius edge of a neighboring element; and a radially extending sealing strip is carried between each pair of neighboring radius edges to close the space therebetween.

8. The invention defined in claim 5, in which: each element is semicircular and each hub member is semicircular and is secured coaxially to the center-proximate portion of an element in register with the respective element so as to embrace half of the shaft; and the hub-securing means comprises threaded fasteners normal to the shaft axis and passed through the members in radially offset relation to the shaft.

9. A multi-piece cotton picker doffer for mounting on and for rotation with an elongated rotatable doffer shaft, comprising: a hub having a sleeve provided with an axial shaft-receiving bore therethrough, said hub sleeve having a radially outwardly projecting doffer mounting seat thereon; a plurality of individual, radially separable plate-like doffer elements having doffing means thereon and contiguously grouped about the hub in a common plane normal to the axis of rotation to comprise a circular plate-like assembly having said axis as its center, each element having a center-proximate notch closely nested with the hub sleeve and a portion bordering such notch and seating on the doffer mounting seat in radially coplanar relation; and releasable annular means coaxially encircling the shaft and carried by the hub sleeve at the axially opposite side of the assembled elements so that the center-proximate notch-bordering portions of the elements are sandwiched between the doffer mounting seat and said annular means, said annular means being movable axially relative to the hub selectively toward and away from the seated notch-bordering portions of the elements for respectively securing said elements in and releasing said elements for radial separation from assembled relation to the hub and to each other.

10. The invention defined in claim 9, in which: the doffer mounting seat and the element center-proximate portions include releasably cooperative parts axially interengageable to prevent radial separation of the elements from the hubs.

11. The invention defined in claim 9, in which: each element is of sector shape having radius edges and each radius edge of each element lies in closely circumferentially spaced relation to and is paired with a radius edge of a neighboring element; and a radially extending sealing strip is carried between each pair of neighboring radius edges to close the space therebetween.

12. The invention defined in claim 9, in which: the doffer mounting seat comprises an annular portion concentric with and fixed to the hub and provided with an annular radial seating surface and said portion has an annular axially directed groove therein opening at said surface; and the center-proximate portions of the elements respectively have tongues received in said groove to hold said elements against radial displacement relative to the hub.

13. The invention defined in claim 9, in which: the doffer mounting seat comprises an annular portion concentric with and fixed to the hub and provided with an annular radial seating surface having serrations thereon; and the center-proximate portions of the elements have serrations thereon interengageable with the seating surface serrations to hold the elements against radial displacement relative to the hub.

14. The invention defined in claim 9, in which: each radius edge of each element lies in closely circumferentially spaced relation to and is paired with a radius edge of a neighboring element and each edge of a neighboring pair has a notch therein, said notches in said pair of edges complementing each other to provide a pocket; and a doffer block received in each pocket and carried therein to cooperate with the aforesaid doffing means.

15. A multi-piece cotton picker doffer for mounting on and for rotation with an elongated rotatable doffer shaft, comprising: a hub having an axial shaft-receiving bore therethrough and further having an annular radially outwardly projecting doffer mounting means including an annular radial seating surface having serrations thereon; a plurality of doffer elements having doffing means thereon and grouped about the hub and projecting radially outwardly therefrom in a common plane normal to the axis of rotation to comprise a unit assembly having said axis as its center, each element having a hub-proximate portion seating on the seating surface of the doffer mounting means and having serrations thereon interengageable with the seating surface serrations to hold the elements against displacement relative to the hub; and releasable means carried by the hub and engaging the seated element portions for securing said elements in assembled relation to the hub and to each other.

16. The invention defined in claim 6, in which: the securing means comprises a pair of half hubs, one on each doffer half and coaxial with the support-receiving notch in said doffer half, and disconnectible securing elements connecting said half hubs together in support-encircling relationship.

17. The invention defined in claim 6, in which: the securing means comprises a pair of axially relatively movable support-encircling members, one above and the other below the doffer unit, said members having portions thereon engaging the doffer halves at portions of said halves bordering the support-receiving notches, and means on said members for drawing said members axially together with said notch-bordering portions secured therebetween.

References Cited in the file of this patent
UNITED STATES PATENTS

| | | |
|---|---|---|
| 2,654,202 | Millard | Oct. 6, 1953 |
| 2,688,225 | Morkoski | Sept. 7, 1954 |
| 2,696,070 | Mitchell | Dec. 7, 1954 |
| 2,699,026 | Cassidy | Jan. 11, 1955 |
| 2,699,028 | Cassidy | Jan. 11, 1955 |
| 2,699,029 | Hubbard | Jan. 11, 1955 |